United States Patent [19]

Aronson

[11] 3,889,396

[45] June 17, 1975

[54] DIRECT FIRE WEAPONS SIMULATOR

[75] Inventor: Moses Aronson, Orlando, Fla.

[73] Assignee: The United States of America as represented by the Secretary of the Navy, Washington, D.C.

[22] Filed: Aug. 19, 1974

[21] Appl. No.: 498,696

[52] U.S. Cl. ................................................ 35/25
[51] Int. Cl. ............................................ F41g 3/26
[58] Field of Search .......... 35/25; 273/101.1, 101.2, 273/105.1; 353/42, 43, 46, 26

[56] References Cited
UNITED STATES PATENTS

| | | | |
|---|---|---|---|
| 2,995,834 | 8/1961 | Rowe | 35/25 |
| 3,811,204 | 5/1974 | Marshall et al. | 35/25 |
| 3,824,008 | 7/1974 | Smith, Jr. | 353/26 |

Primary Examiner—Robert W. Michell
Assistant Examiner—John H. Wolff
Attorney, Agent, or Firm—R. S. Sciascia; J. W. Pease; J. F. Miller

[57] ABSTRACT

A direct fire weapons trainer in which a motion picture projector is provided to display on a projection screen, coated with photochromic material, a background scene and a moving target, and in which a weapon to be fired at the target by a trainee is provided with an illuminator fixed to the weapon and selected in wave length to direct a beam in the direction of fire of the rifle to create a dark spot on the screen at the point representing the bullet impact with a vertical plane which passes through the moving target. Provision is also made for a trigger operated switch means on the rifle and a programmable flight time means, setable by the instructor to provide for delays in activation of the illuminator in accordance with calculated flight time dependent upon the specific weapon and conditions being simulated. The invention further contemplates the provision of means for stopping the projector to examine the hit score on the screen and the provision of light means of a specific wave length region to rapidly erase the dark spots on the screen to condition the same for another round of fire.

4 Claims, 4 Drawing Figures

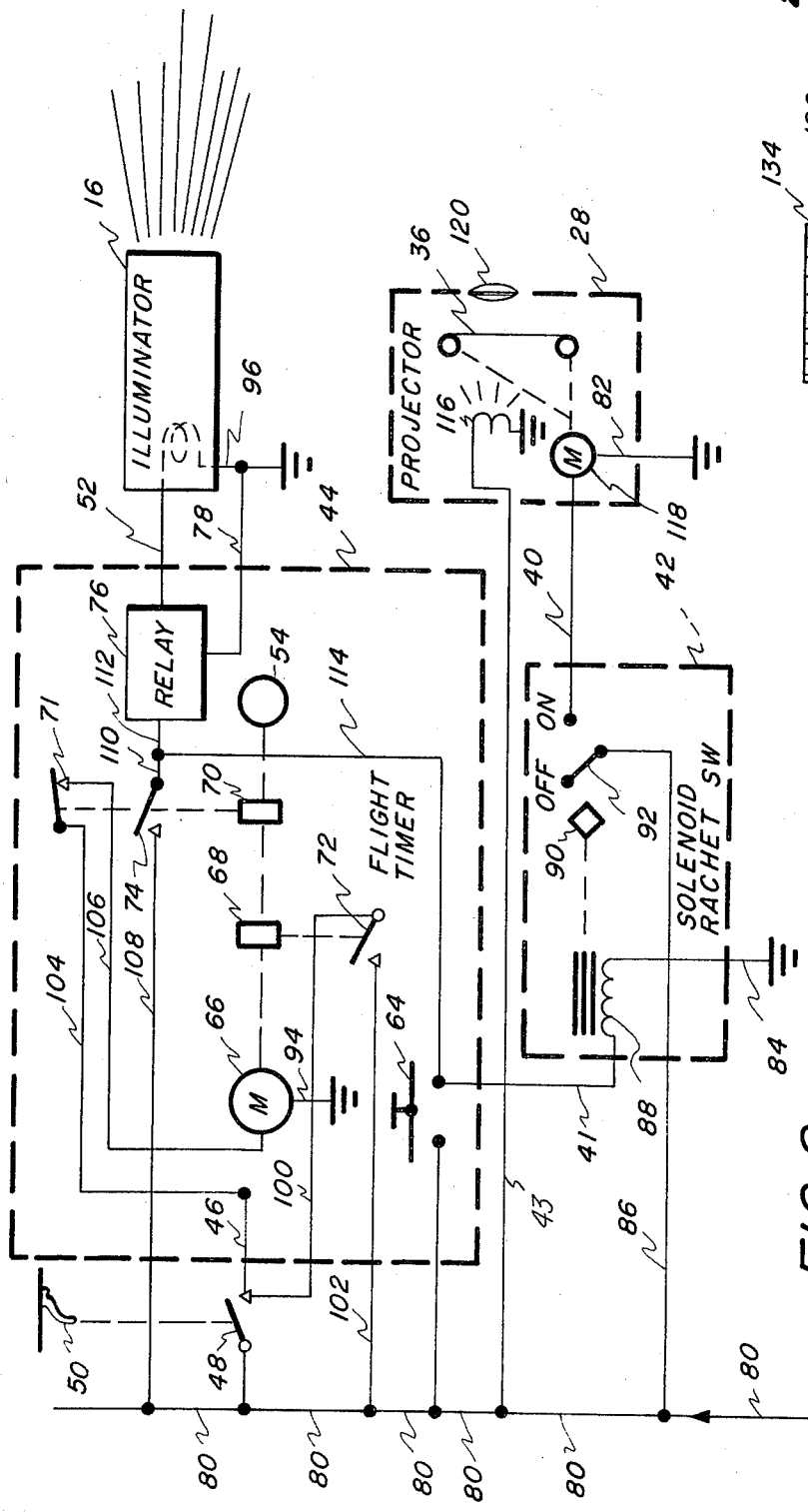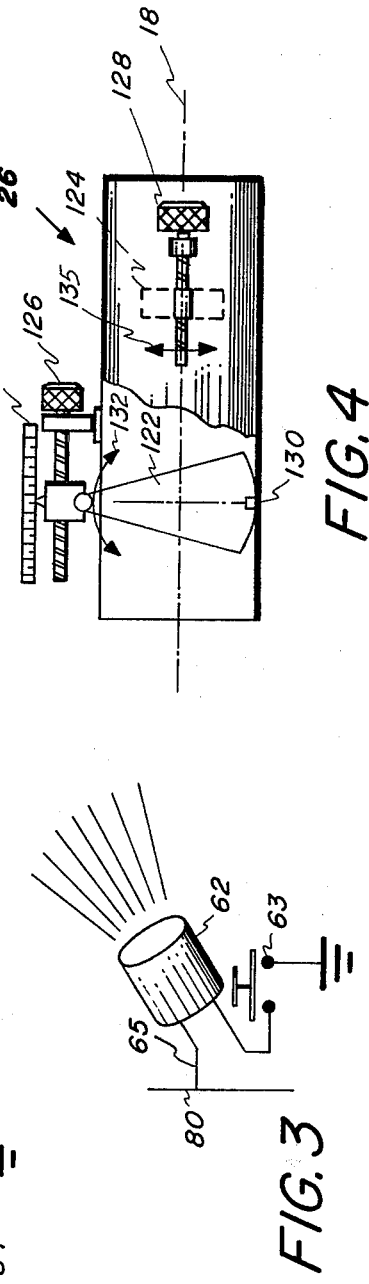

DIRECT FIRE WEAPONS SIMULATOR

BACKGROUND OF THE INVENTION

The invention relates to the field of education and training in direct fire weapons and to the field of simulation.

In order that military combat practice in the area of direct fire weaponry may be carried out in a realistic, yet economical, fashion such as to provide effective training comparable to the use of operational equipment and live round ammunition, past efforts have been directed to various forms of simulation equipment. Among the prior art methods and apparatus are the employment of radiation transmitters for emitting a narrow beam of optical radiation, mounted and aimed with the weapon simulated and combined with beam radiation detector means fixed to or in orientation to a target screen, together with hit (or miss) indicator means in the form of audio or visual signal means. Difficulties of the prior art approaches include the cost and complexity of hit indicator systems when detectors are located at the target and radio transmitting or optical transmission means are required to feed scoring information back to the trainee or instructor. A further disadvantage lies in the spacing required for detectors (light sensors) to cover the target area. Further difficulty lies in the lack of realistic score information where a visual or audio signal singly indicates a hit or miss or possibly quadrant information. An actual, precise indication of hit spot in relation to a moving target is the desired end. Further, such exact information in a retainable form for an at-length review by student and instructor would further enchance the effectiveness of the trainer and no such apparatus is available to applicant's knowledge.

SUMMARY OF THE INVENTION

The subject invention provides an arrangement and association of elements which includes a display screen of photochromic material which, when actuated by an illuminator producing a defined wave length beam and aimed with the weapon, produces a hit spot on the target which will retain its condition to permit visual observation and evaluation. This feature is combined with a motorized projector which can be stopped to maintain the film in the frame at which the hit would have occurred if the situation was real firing in the field. The invention further contemplates, in association with the foregoing elements, a flight time means to delay the activation of the hit illuminator beam to allow for flight time characteristics of the weapon being simulated and the stopping of the projector at the frame at which the hit occurred. Further provision is made for hit erasure means in the form of an infrared lamp or other light source at 800 nanometers or above to quickly remove the hit mark for a recycle operation of the apparatus. A further aspect of this invention provides a manually adjustable prism means for mounting on the illuminator to insert ballistic problems relating to elevation and azimuth for which trainee must adjust his aim.

BRIEF DESCRIPTION OF THE DRAWING

FIG. 2 is a schematic showing details of an electrical circuit suitable for use in the trainer of FIG. 1;

FIG. 3 is a diagrammatic view of an erasure light means employed with the apparatus of FIG. 1; and FIG. 4 is an elevational view partly broken away of one suitable prism means for the apparatus of FIG. 1.

DESCRIPTION OF THE PREFERRED EMBODIMENT

Figure 1:
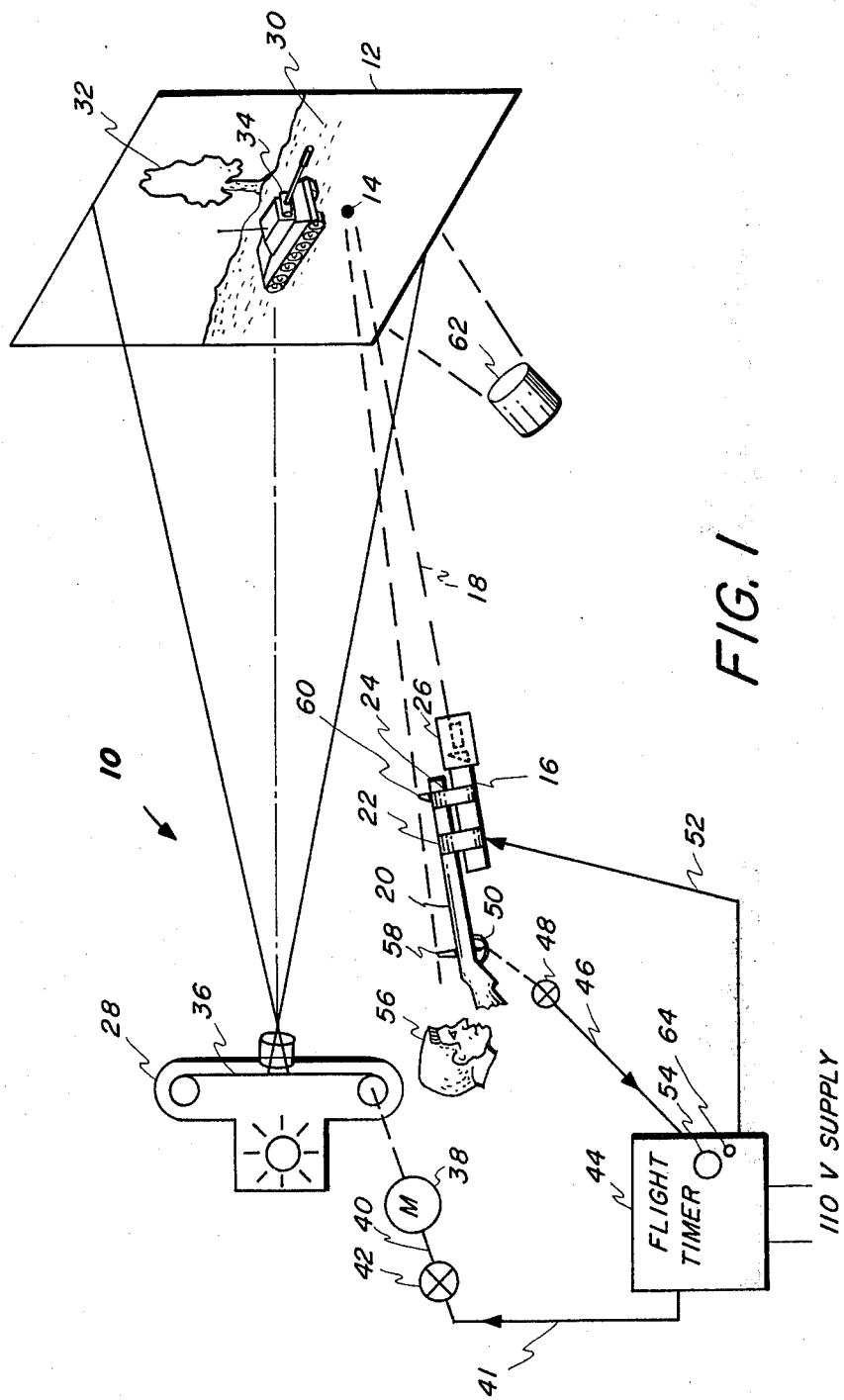
FIG. 1 is a diagrammatic view of a weapons trainer incorporating the invention.

Referring to FIG. 1 of the drawing, the simulator indicated generally at 10 includes a projection screen 12 having a photochromic material coating to provide a darkened spot 14 hit indication when exposed to the beam of an illuminator 16 selected to project a beam, indicated at 18, of wave length less than 480 nanometers and affixed to a weapon 20 to direct said beam in the direction said weapon is aimed. In the present instance the weapon 20 is shown to have a projectile barrel 22 to which the illuminator 16 is affixed by mounting means 24. Adjustable beam redirection means, as for example adjustable prism means 26, is provided to vary the beam 18 from a path parallel to the aimed direction of the rifle to thereby introduce an error of elevation and azimuth equivalent to calculated ballistic effects, and thereby require correction for such effects by the trainee in aiming the gun.

A quickstop motion picture projector 28, similar to Bauer Selectron 11-0, or RFD Ltd. Cine Target Training Equipment is provided to project a background motion picture scene, exemplified by terrain 30 and tree 32 and a moving target, exemplified by tank 34, on the display screen 12. The projector film, or films, exemplified by film 36, may show a series of training exercises such as moving jeeps, or tanks or concealed troops moving in woods on a line normal to the line of fire of the trainee. The driving motor for the film 36 is indicated at 38 and is connected by lines 40 and 41 and switch means 42 for operation from a flight timer means 44. In practice one would probably use a more sophisticated flight timer means such as any small digital or analog computer which is capable of solving the equation, $t = C \sec \theta_o [T(u) - T(v_o)]$ or $X = C [S(u) - S(v_o)]$. This notation on formulas is taken from Ingalls Ballistic Tables contained in the U.S. Army Artillery Circular M. The flight timer 44 is also connected by line 46 and switch means 48 for operation from actuation of the trigger 50 of the rifle 20, and is connected by line 52 to illuminator 16 for actuation of the latter from operation of the trigger 50 after a time delay dependent upon the ballistic flight time established by the flight timer 44. The flight timer is provided with a knob 54 by which it can be set by the instructor to a flight time corresponding to ballistics characteristics of the particular problem.

In operation, the trainee, indicated at 56, adjusts and holds the weapon as he would on the firing range or in field exercises, his scope 58 and sight 60 are set for given range and windage. Prism means 26 is adjusted in azimuth for given windage to throw the beam 18 off normal, and adjusted in elevation to simulate the drop due to range. The trainee sights on the designated moving target projected on the screen and tracks it until he fires. The squeezing of the trigger 50 closes an electrical circuit represented by line 46 via the closing of switch means 48 to present a firing signal input to flight timer 44. The timer having been adjusted by the instructor via knob 54 for time action corresponding to the type of weapon being simulated and factors of range and windage, does then provide a delayed output signal on line 52 to activate illuminator 16. The delay time is the calculated flight time. The signal passed to illuminator 16 causes it to beam a spot of light on screen 12 at the point 14 where a real round of ammunition would have hit under the conditions and aim presented. In the example of FIG. 1, it shows that the aim was low and the target was led too far in advance.

An advantage of the subject invention is that the spot 14 thus developed is not a mere flash on the screen. It remains a darkened spot for a time period permitting close examination. To aid in exploiting this feature the flight timer, at the time of actuating the illuminator 16, also stops the motor 38 and film 36 via the switch means 42 to permit leisurely examination of the hit or miss condition. The spot 14 will eventually disappear. However, to hasten its elimination and continue with the next firing round, I provide an eraser lamp 62 which produces an infrared beam of wave length of 800 nanometers or above. Switch means 42 is then reset automatically by flight timer 44 to enable a succeeding operation of the film 36 and knob 54 may be adjusted by the instructor to begin a second cycle of operation.

The prism means 26 may be pre-positioned by the instructor to represent the elevation, lead and side drift effects that a real fired round would be exposed to if the weapon was actually fired on a real moving target.

The instructor advises the trainee of the conditions of range, target speed, angle, windage, etc. and adjusts the flight timer 44 via knob 54 to call for an output of flight time corresponding to the introduced conditions. Then the trainee and flight timer take over.

In FIG. 2 is shown details of one suitable electrical schematic for the apparatus of FIG. 1. Thus FIG. 2 shows in particular details of the flight timer 44, solenoid ratchet switch 42, illuminator 16 and projector 28, all in relation to the trigger 50 by which the trainee operates the switch 48 to activate the illuminator 16 which hit marks the target screen 12. FIG. 2 also shows the dial 54 and momentary contact switch 64 by which the instructor respectively sets up the ballistics data and conditions the apparatus for firing.

The flight timer 44 comprises a motor 66 having a gear drive output to slowly turn cams 68 and 70 connected to the motor 66 as indicated by dotted line. Cam 68 is connected as indicated by dotted line to close a normally open switch 72 which is connected by lines 100 and 102 in parallel with trigger responsive switch 48 (normally open) such that when the trainee squeezes and then releases the trigger 50 the motor 66 will remain energized from the input power line 80. A (normally closed) switch 71 is placed in series with the motor 66 by lines 104 and 106 to provide for disconnecting the motor 66 at a proper time determined by the setting of cam 70 which is initially set for time cycle by the instructor's setting of the knob 54. Cam 70 is also connected mechanically as indicated by dotted line to operate a stop switch 74 (normally open) which supplies power to the relay 76 via lines 108, 110 and 112 and to ratchet switch solenoid 88 via lines 114 and 41. Return lines throughout FIG. 2 are indicated by grounds. Thus, coil 88 is grounded by line 84. The flight timer 44 also includes the time set relay 76 which feeds illuminator 16 via line 52 and which is grounded via lines 78 and 96 as indicated.

The solenoid operated ratchet switch 42 is provided to turn the projector 28 on when the instructor has set the flight timer knob 54 and pressed the start switch 64.

The solenoid 88 is mechanically connected to drive a ratchet 90 as indicated by dotted line whereupon the ratchet activates the switch 92 to "on" condition providing power to the projector 28 from power input line 80 via feed lines 86 and 40.

Power from the line 40 drives the motor 118 of the projector 28. Light 116 is energized via line 43. Motor 118 drives (as indicated by dotted lines) the film 36. Motor 118 is grounded as indicated via line 82 and a projector lens 120 represents the projector optics of the projector 28.

Prism means 26 in FIG. 1 represents any beam deflection system suitable to deflect the light beam 18 in elevation and azimuth and can be adjusted manually or by a servo motor system, or by computer means and servo means. Since applicant's invention does not reside in the deflection means per se, a simple suitable deflection system is shown in FIG. 4 wherein prisms 122 and 124 are pivoted on axis 90 degrees removed from each other and are adjusted by respective mechanical screw drive means 126 and 128. Thus, prism 122 is pivoted on an axis indicated at 130 to provide an arcuate swing, as indicated by arrows 132. The degree of adjustment of tilt is indicated on a scale 134. The same arrangement is provided for prism 124, except that its end attached to the adjusting screw 128 is moved in the arc indicated by arrow headed arc lines 135, which is 90° removed from the arc 132. Thus, prism 122 can provide elevation adjustment and prism 124 can provide azimuth adjustment when the screws 126 and 128 are adjusted.

FIG. 3 is provided to show the eraser lamp 62 powered from input line 80 via feed line 65 and connected to return ground indicated via switch 63.

Reviewing the operation of the invention with the benefit of the specific details of circuitry mentioned above, the instructor, prior to arrival of the trainee, adjusts the prism mechanism 26 as for example by adjusting screws 126 and 128 (FIG. 2), to provide for the proper ballistic characteristics relating to elevation and azimuth. Ballistic tables, such as the U.S. Army Artillery Circular M, provide the necessary information relating specific weapon, ammunition, temperature, meteorological data, air temperature, etc., to determine the proper setting of elevation and azimuth in the prism means 26. Further, using the corrected time of flight, obtained from such data and range, the instructor manually sets the cam 70 by rotating the knob 54, thus setting the flight timer circuit. The projector 28 is loaded with a selected film 36.

Thereafter, the trainee sights weapon 20 through rear sight 58 and front sight 60 toward the blank screen 12 and the instructor starts the motion picture projector 28 by momentarily pressing switch 64 (FIG. 2). Closing switch 64 actuates the solenoid relay 88 of ratchet switch 42 to move switch 92 from "off" to "on" condition thereby supplying power to the projector 28. The trainee then tracks the image target 34 (FIG. 1) and squeezes trigger 50 when he believes he has the proper lead and elevation to hit the moving target 34. When trigger 50 is squeezed, switch 48 is thereby momentarily closed to supply power to timer motor 66. As soon as motor 66 starts it turns cam 68 to close switch 72 and thereby hold power on motor 66. This results because switch 72 is in parallel with switch 48. Timer motor 66 having a continuing supply of power continues to rotate and to turn cam 70 until at the selected setting of cam 70 (by knob 54) the pre-set time limit (corresponding to weapon and ballistics characteristics) is reached. At the end of the pre-set time period the cam 70 opens switch 71 to deenergize and stop timer motor 66 and closes switch 74 to apply power to relay 76 and to solenoid switch 42. Power applied to the solenoid switch 42 actuates the ratchet 90 to move switch 92 from "on" to "off" position and thereby deenergizes the motor 118 of projector 28 to stop film 36. The projector 28 is a standard projector with built-in brake means to rapidly stop the film in a proper frame position and also has means for protecting the standing film from the heat of the light 116.

The time set relay 76 is selected in time delay for about one twenty-fourth of a second to allow time for the motion picture film to stop on a particular frame. The relay is also selected for an "on" time of about one-half second to provide the time to effect on the screen 12 a visible spot indicating the location of hit.

The problem is now complete and while the film is still projecting an image on the screen and the effected spot is still visible, the instructor discusses with the trainee his faults in aim, such discussion being with the visible aid of the projected image and hit spot.

After completion of the results review, the instructor can now present another problem to the trainee. To do this he closes switch 63, FIG. 3, to actuate erase light 62 which erases the hit spot from the screen 12. (The lamp is pointed at the spot to bleach and thus erase the same.) The instructor now resets the flight timer 44 for the new problem by setting the knob 54 to the proper setting for the ballistics of the problem. The film in the projector is manually turned to the next exercise on the film, the student takes aim at the screen 12, and the instructor presses the start switch 64 to begin the new exercise.

What is claimed is:

1. An improved direct fire weapons simulator comprising
    a trainee controlled trigger fire weapon having an "on-off" switching circuit operated from said trigger and a projectile barrel,
    a projection screen coated with photochromic material,
    a motion picture projector for displaying on said screen a background and a moving target,
    an illuminator selected to project a beam of wave length less than 480 nanometers and affixed to said weapon to direct said beam parallel to the barrel of said weapon in the direction said weapon is aimed,
    a flight timer having instructor operable adjustment means to set the timer for delayed time outputs corresponding to the equations of flight for the specific cartridge or round and weapon to be simulated in flight time to the target,
    said timer being connected to said trigger operated switching circuit for activation responsive to firing said weapon and to said illuminator to cause said delayed time output signals to activate said illuminator and produce a darkened hit spot on said screen at a point in relation to said moving target dependent upon the accuracy of aiming of said weapon.

2. Apparatus according to claim 1, including
switch means responsive to an output from said flight timer to stop said projector at the same time said illuminator is energized to provide time for detailed examination of the hit or miss information on said screen.

3. Apparatus according to claim 2, including
an erasure lamp of wave length about 800 nanometers directed toward said screen to erase said hit spot for recycle of the simulation apparatus.

4. Apparatus according to claim 1, including
a manually setable prism means attached to said illuminator to establish preset beam deflection in elevation and azimuth corresponding to the effect of elevation lead and side drift effect such that the trainee must also allow for such effects in aiming the weapon.

* * * * *